US012047977B2

(12) United States Patent
Shrivastava et al.

(10) Patent No.: US 12,047,977 B2
(45) Date of Patent: Jul. 23, 2024

(54) METHODS AND SYSTEMS FOR SENDING INTEREST INDICATION FOR MULTICAST AND BROADCAST SERVICES IN 5G WIRELESS NETWORK

(71) Applicant: Samsung Electronics Co., Ltd., Suwon-si (KR)

(72) Inventors: Vinay Kumar Shrivastava, Bangalore (IN); Fasil Abdul Latheef, Bangalore (IN); Himke Van Der Velde, Staines (GB); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/507,212

(22) Filed: Oct. 21, 2021

(65) Prior Publication Data
US 2022/0132468 A1  Apr. 28, 2022

(30) Foreign Application Priority Data

Oct. 22, 2020  (IN) .............................. 202041046158
Oct. 5, 2021   (IN) .............................. 2020 41046158

(51) Int. Cl.
 *H04W 72/30* (2023.01)
(52) U.S. Cl.
 CPC .................................. *H04W 72/30* (2023.01)
(58) Field of Classification Search
 CPC ..................................................... H04W 72/30
 See application file for complete search history.

(56) References Cited

U.S. PATENT DOCUMENTS

| | | | | |
|---|---|---|---|---|
| 2011/0145387 A1* | 6/2011 | Peng | ...................... | H04L 12/189 |
| | | | | 709/223 |
| 2015/0049600 A1* | 2/2015 | Balasubramanian | ........................ | |
| | | | | H04W 76/40 |
| | | | | 370/216 |
| 2015/0131613 A1* | 5/2015 | Jung | .................. | H04W 36/0007 |
| | | | | 370/331 |

(Continued)

OTHER PUBLICATIONS

Catt, 'Discussion on Mobility with Service Continuity in RRC_Connected', R2-2006595, 3GPP TSG-RAN WG2 Meeting #111-e, Aug. 7, 2020.

(Continued)

*Primary Examiner* — Hassan A Phillips
*Assistant Examiner* — Prenell P Jones
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. Embodiments allow sending interest indication, by a user equipment (UE), to a 5G network, to indicate whether the UE is interested in receiving multicast and broadcast services (MBS) and/or MBS that are being currently received by the UE. Embodiments provide a mechanism to send interest indication.

16 Claims, 10 Drawing Sheets

(56) References Cited

U.S. PATENT DOCUMENTS

| | | | |
|---|---|---|---|
| 2016/0073302 A1* | 3/2016 | Yang | H04W 36/0061 |
| | | | 370/331 |
| 2016/0249183 A1* | 8/2016 | Kim | H04W 4/06 |
| 2016/0249266 A1* | 8/2016 | Kim | H04W 4/06 |
| 2017/0054568 A1* | 2/2017 | Lee | H04W 16/24 |
| 2017/0180952 A1* | 6/2017 | Kim | H04W 4/06 |
| 2017/0310718 A1* | 10/2017 | Kim | H04L 12/1877 |
| 2018/0049224 A1* | 2/2018 | Dinan | H04W 72/21 |
| 2018/0139665 A1* | 5/2018 | Park | H04W 36/0007 |
| 2018/0160342 A1* | 6/2018 | Park | H04W 36/0033 |
| 2018/0160398 A1* | 6/2018 | Park | H04W 4/06 |
| 2018/0160436 A1* | 6/2018 | Park | H04W 76/14 |
| 2018/0192255 A1* | 7/2018 | Guo | H04W 72/30 |
| 2018/0199163 A1* | 7/2018 | Chen | H04W 48/14 |
| 2018/0206080 A1* | 7/2018 | Chen | H04W 76/40 |
| 2019/0230564 A1 | 7/2019 | Kim et al. | |
| 2019/0239032 A1* | 8/2019 | Balasubramanian | |
| | | | H04L 65/611 |
| 2021/0392466 A1* | 12/2021 | Liu | H04L 5/0053 |
| 2022/0132467 A1* | 4/2022 | Shrivastava | H04W 68/00 |
| 2023/0027425 A1* | 1/2023 | Zhu | H04W 36/08 |
| 2023/0029146 A1* | 1/2023 | Kadiri | H04W 36/0016 |
| 2023/0030347 A1* | 2/2023 | Kim | H04W 4/50 |
| 2023/0171791 A1* | 6/2023 | Fujishiro | H04W 4/06 |
| | | | 370/312 |
| 2023/0232189 A1* | 7/2023 | Kim | H04W 4/06 |
| | | | 370/312 |

OTHER PUBLICATIONS

Vivo, 'MBS Service Continuity for RRC Connected UE', R2-2007035, 3GPP TSG-RAN WG2 Meeting # 111-e, Aug. 7, 2020.

International Search Report and Written Opinion dated Jan. 26, 2022, issued in International Patent Application No. PCT/KR2021/014785.

3GPP; Technical Specification Group Radio Access Network; Evolved Universal Terrestrial Radio Access (E-URTA); Radio Resource Control (RRC); Protocol specification (Release 16), 3GPP TS 36.331, vol. Ran WG2, No. V16.2.1, XP051961601, Oct. 7, 2020.

Extended European Search Report dated Feb. 29, 2024, issued in European Patent Application No. 21883271.5-1216.

* cited by examiner

METHODS AND SYSTEMS FOR SENDING INTEREST INDICATION FOR MULTICAST AND BROADCAST SERVICES IN 5G WIRELESS NETWORK

CROSS-REFERENCE TO RELATED APPLICATION(S)

This application is based on and claims priority under 35 U.S.C. § 119(a) of an Indian Provisional patent application number 202041046158, filed on Oct. 22, 2020, in the Indian Patent Office, and of an Indian Non-Provisional patent application number 202041046158, filed on Oct. 5, 2021, in the Indian Patent Office, the disclosure of each of which is incorporated by reference herein in its entirety.

BACKGROUND

1. Field

The disclosure relates to reception of multicast and broadcast services in 5th Generation (5G) communication networks. More particularly, the disclosure relates to methods and systems for managing the reception of Multicast and Broadcast Services (MBS) from a 5G network using interest indication messages.

2. Description of Related Art

To meet an increasing demand for wireless data traffic since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) Frequency Quadrature Amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, 3rd Generation Partnership Project (3GPP) is aiming at introducing support for multicast and broadcast services in New Radio (NR) or 5th Generation (5G) wireless communication networks. The multicast and broadcast services can be provided in NR networks using Multicast Broadcast Services (MBS). In Long Term Evolution (LTE) 4th Generation (4G) wireless communication networks, multicast and broadcast services are supported through Multimedia Broadcast Multicast Services (MBMS). The architecture and requirements of 5G MBS is likely to differ significantly from MBMS. Efforts are being made in designing network architecture and User Equipment (UE) that are capable of supporting MBS.

Specifically, multicast services can refer to services being transmitted and availed by a set of UEs registered in a group (such as Mission Critical Push-To-Talk (MCPTT) group). Broadcast services refer to services being transmitted and available to all the UEs in a specific coverage area where broadcast is performed, and, typically, there may not be requirements for the UEs to register for availing the broadcast service (such as Television channels broadcast). Therefore, effectively, both multicast and broadcast services are Point-To-Multipoint (PTM) services as there is a single transmitter (service provider) and multiple receivers (subscribers). It is also possible to provide multicast and broadcast services in a Point-to-Point (PTP) manner, wherein multiple PTP connections can provide the same MBS to a number of individual recipients. Apart from multicast and broadcast services, there are another category of services, viz., Unicast services, which involves a single recipient and requires a dedicated connection between transmitter and receiver (such as File Transfer Protocol (FTP), Hyper Text Transfer Protocol (HTTP), browsing, voice call services over cellular communication, and so on).

An MBS bearer can be a PTM bearer, a PTP bearer or a combination of a PTM bearer and a PTP bearer (also termed as MBS split bearer as it has a PTM leg (reception path) and a PTP leg), can be used for providing the same MBS. The combination of PTM and PTP bearers may provide additional features such as increase in reliability of reception of MBS packets and efficient switching between PTM and PTP modes of reception (the switching may be required because of mobility of UE availing MBS, loading conditions of network providing MBS, user request density for reception of MBS changes, and, accordingly, determination of MBS delivery mode (PTM, PTP or MBS split bearer) by the network providing MBS and/or switching the MBS delivery mode.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for sending interest indication, by a User Equipment (UE), to a wireless network, to indicate whether the UE is receiving multicast and/or broadcast services or interested to receive multicast and/or broadcast services. In another embodiment, interest indication pertains specifically to multicast and/or broadcast services that UE is receiving and/or interested to receive via MBS bearer.

Another aspect of the disclosure is to provide a mechanism for sending a Multicast Broadcast Services (MBS) interest indication for multicast and/or broadcast services, wherein the mechanism specifies information elements to be included in a MBS interest indication message, triggers and events for sending a MBS interest indication message, procedure for notifying complete loss of interest of the UE in receiving MBS, approaches and messages to be used for sending a MBS interest indication message.

Another aspect of the disclosure is to ensure continuity in delivery of at least one MBS session when the UE is handed over to a target cell or target Next Generation Node B (gNB), wherein continuity in delivery of at least one MBS session is ensured by at least one of forwarding, by a serving gNB, a received MBS interest indication information for multicast and/or broadcast services to a plurality of candidate cells or candidate gNBs to facilitate relevant MBS configuration/service provisioning prior to handover, forwarding, by the serving gNB MBS configurations, received from at least one candidate gNB or candidate cell, to the UE through a Radio Resource Control (RRC) reconfiguration message, and ensuring early acquisition of a target cell/gNB and MBS configuration and preventing loss of MBS continuity.

Additional aspects will be set forth in part in the description which follows and, in part, will be apparent from the description, or may be learned by practice of the presented embodiments.

In accordance with an aspect of the disclosure, methods and systems for managing reception of Multicast Broadcast Services (MBS) by a User Equipment (UE) based on interest indication are provided. In an embodiment, the UE can send an interest indication message to a Next Generation Node B (gNB), to indicate interest of the UE in receiving at least one MBS or at least one MBS that is currently being received by the UE. The UE can receive an MBS configuration, from the gNB, for receiving the at least one MBS if the UE sends the interest indication to indicate interest in receiving the at least one MBS. The at least one MBS, indicated in the interest indication message, includes at least one of broadcast services, multicast services, and a combination of broadcast services and multicast services. In an embodiment, the UE can receive the MBS configuration and avail the at least one MBS when the UE is operating in either RRC_CONNECTED state, RRC_INACTIVE state, or RRC_IDLE state. In an embodiment, the multicast services can be availed only in the RRC_CONNECTED state, whereas the broadcast services can be availed in the RRC_CONNECTED state, the RRC_INACTIVE state, and the RRC_IDLE state.

In an embodiment, the UE sends the interest indication to request the (serving) gNB to handover the UE to a target gNB providing the at least one MBS that the UE is receiving and/or interested to receive. The UE can send interest indication to inform the serving gNB about the priority of MBS with respect to that of unicast reception. The UE can send the interest indication when the UE is operating in the RRC_CONNECTED state or when the UE switches to the RRC_CONNECTED state. In an embodiment, the UE initiates a service joining procedure using Non-Access Stratum (NAS) signalling. The UE sends the interest indication using a RRC signalling message (such as a UE assistance information message or a new RRC message for sending the MBS interest indication). The service joining procedure is initiated if the serving gNB is providing the at least one MBS that the UE is interested to receive. If the UE is presently in the RRC_IDLE state or the RRC_INACTIVE state, the UE can transit to the RRC_CONNECTED state by sending a RRC connection request (in the RRC_IDLE state) or a RRC Resume request (in the RRC_INACTIVE state).

In an embodiment, the UE can also send the interest indication to indicate complete loss of interest in receiving multicast and/or broadcast services, preference for operating in one of a MBS Point-To-Multipoint (PTM) mode, a MBS Point-To-Point (PTP) mode, MBS split bearer mode or an unicast mode, preference for Bandwidth Part (BWP) for availing MBS or unicast services, and one or more broadcast and/or multicast services that the UE is receiving or is interested to receive. In an embodiment, the interest indication comprises a Temporary Mobile Group Identity (TMGI) indicating the at least one MBS the UE is interested to receive and/or the at least one MBS currently being received by the UE, priority for MBS reception or unicast reception (alternatively, priority (MBS over Unicast) is provided per BWP and/or per MBS service), preferred cast type indicating a preference for receiving MBS in the PTM mode or the PTP mode or MBS split bearer mode, list of frequencies that are preferred or supported by the UE for receiving MBS, preferred BWP for receiving MBS, preferred sub-carrier spacing, preferred frequency range, and resource or computational capability of the UE. The at least one MBS indicated in the interest indication message can be at least one of broadcast service or multicast service or a combination of the broadcast service and the multicast service.

In an embodiment, the UE can send the interest indication in conditions comprising successful establishment of Radio Resource Control (RRC) connection, the UE entering a MBS service area (broadcast service area and/or multicast service area), the UE leaving the MBS service area, start of a MBS session, stop of a MBS session, a change of interest in MBS to be received or MBS presently receiving, a complete loss of interest in MBS, change in priority for MBS reception or unicast reception, change in broadcasted system information, change in serving cell broadcasting system information for MBS, Service Area Identity (SAI) and frequency mapping information, initiation of reception of MBS, termination of reception of MBS, BWP switching, change in UE capability pertaining to number of supported RX, change in baseband computational capabilities and/or resources causing inhibition and/or removal of inhibition for MBS support, and change in at least one of frequency of reception of MBS, BWP of MBS reception, bandwidth of MBS reception, frequency range for MBS reception and a subcarrier spacing of MBS.

In an embodiment, the interest indication can be sent in RRC signaling message such as UE Assistance Information (UAI) message or a new RRC message termed as MBS Interest Indication (MII) message.

In an embodiment, the interest indication can be sent either in MSG 3 of random access procedure, MSG 5 of random access procedure, in RRC setup complete message, or MSG A of 2-step random access procedure. In an embodiment, the interest indication message can be sent before security activation. In an embodiment, the interest indication message is sent after the security activation.

In an embodiment, the serving gNB can forward the interest indication to a plurality of candidate gNBs prior to, or during, a handover operation. The serving gNB can forward the interest indication in an Information Element (IE) of a handover preparation Internode Message (INM). The at least one of plurality of candidate gNB(s) can set up at least one of requested MBS sessions of interest, which have not been established. In an embodiment at least one candidate gNB, from amongst the plurality of candidate gNBs, provide, to the source gNB, MBS configurations for the MBS sessions of interest. The serving gNB receives MBS configuration parameters pertaining to the at least one candidate cell. In an embodiment, the serving gNB can receive an INM response message as a handover acknowledge message, if the at least one candidate gNB supports the at least one MBS that the UE is receiving and/or is interested to receive (establish the MBS sessions of interest), wherein the INM response message further comprises a list of MBS supported by the at least one candidate gNB. In an embodiment, the MBS configuration parameters includes at least one of a target cell MBS bearer configuration, Discontinuous Reception (DRX) scheduling information, first received Packet Data Convergence Protocol (PDCP) sequence number, first received Radio Link Control (RLC) sequence number, security context, security key parameters, Group-Radio Network Temporary Identifier (G-RNTI) or Cell-Radio Network Temporary Identifier (C-RNTI), delivery mode supported (PTM, PTP, combination of PTM and PTP), and layer and module configurations relevant for MBS reception.

In an embodiment, the serving gNB sends the received MBS configuration parameters to the UE in a RRC reconfiguration message. Based on the MBS configuration in the RRC reconfiguration message, UE continues the ongoing MBS services in the target cell or gNB after handover or establishes the interested services in the target cell or gNB. For the ongoing MBS services, which are not supported in the target cell UE stops these services or attempts to avail these services in unicast mode.

In an embodiment, when MBS configuration parameters, execution conditions, and measurements configurations, pertaining to multiple candidate gNBs are provided to the UE in the RRC reconfiguration message (during conditional handover (CHO) execution), the UE selects a target gNB and/or associated MBS configurations, from amongst the multiple candidate gNBs, based on at least one of fulfillment of the execution conditions, measurement criteria, and support for the MBS sessions of interest.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
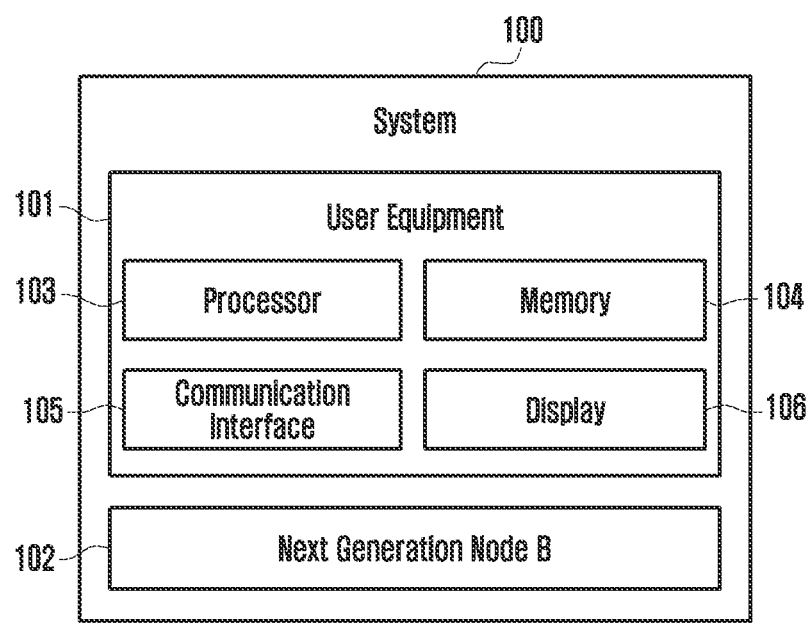
FIG. 1 depicts a system comprising a User Equipment (UE) and a Next Generation Node B (gNB), wherein the system is configured to manage providing Multicast Broadcast Services (MBS) and availing MBS, in a New Radio (NR) network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for sending interest indication to at least one of indicate interest in receiving multicast and broadcast services in New Radio (NR) and inform multicast and broadcast services, if any, that are currently being received. In another embodiment, interest indication pertains specifically to multicast and/or broadcast services that UE is receiving and/or interested to receive via MBS bearer. Referring now to the drawings, and more particularly to FIGS. 1 through 10, where similar reference characters denote corresponding features consistently throughout the figures, there are shown preferred embodiments.

FIG. 1 depicts a system 100 comprising a User Equipment (UE) 101 and a Next Generation Node B (gNB) 102, wherein the system 100 is configured to manage providing Multicast Broadcast Services (MBS) and receiving MBS, in a New Radio (NR) network, according to an embodiment of the disclosure.

Referring to FIG. 1, the UE 101 comprises a processor 103, a memory 104, a communication interface 105, and a display 106. In an embodiment, the UE 101 can send an interest indication to inform the gNB 102 that the UE 101 is receiving MBS services. In another embodiment, the UE 101 can send an interest indication to inform the gNB 102 that the UE 101 is interested in receiving MBS through MBS bearer. In NR, the approaches, governing the procedure of sending interest indication and availing MBS, by the UE 101, include A1, A2, B and B-Variant. The procedure involves the UE 101 sending an interest indication to the gNB 102. Thereafter, the UE 101 can receive MBS configuration from the gNB 102. The MBS configuration allows the UE 101 to receive MBS from the gNB 102.

In the A1 approach, the UE 101 can receive MBS in RRC_IDLE state or RRC_INACTIVE state, apart from RRC_CONNECTED state. Service examples can include critical communication services, public safety services, low Quality of Service (QoS) multicast services, and so on. In order to receive MBS, the UE 101 needs to receive MBS configuration. The UE can avail MBS using Point-to-Multipoint (PTM) configuration in any of the RRC states, or Point-to-Point (PTP) configuration in the RRC_CONNECTED state. In order to receive PTM configuration, the UE 101 needs to be in the RRC_CONNECTED state. Once the UE 101 receives the PTM configuration in the RRC_CONNECTED state, the UE 101 can switch to the RRC_IDLE or the RRC_INACTIVE state and continue to receive MBS service.

In the A2 approach, the UE 101 needs to operate in the RRC_CONNECTED state for receiving MBS. Service examples can include multicast services, high reliability or low latency services, and so on. If the UE 101 is in the RRC_IDLE state or the RRC_INACTIVE state, the UE 101 needs to switch to the RRC_CONNECTED state for receiving PTM configuration or PTP configuration from the gNB 102. Further, the gNB 102 needs to remain in the RRC_CONNECTED state for MBS reception. In the B approach and the B-Variant, the UE 101 can receive MBS configuration in the RRC_IDLE state or the RRC_INACTIVE state. Service example include broadcast services, low QoS multicast services, and public safety services. Further, the UE 101 can remain in the RRC_IDLE state or the RRC_INACTIVE state for MBS reception. In an embodiment, in the B approach, MBS control information can be provided to the UE 101, by the gNB 102, on Multicast Control Channel (MCCH). On the other hand, in the B-Variant approach, the MBS control information can be provided to the UE 101 by the gNB 102, on Broadcast Control Channel (BCCH) (System Information Block (SIB)).

In an embodiment, a session join procedure informs the gNB 102 about interest of the UE 101 for a specific MBS. The UE 101 sending an interest indication to the gNB 102 allows the gNB 102 to effectively support critical services (such as Mission Critical Push to Talk (MCPTT)), wherein the UE 101 may need to receive the services immediately. In such scenarios, the gNB 102 (or Random Access Network (RAN)) ensures that the UE 101 is camped on the appropriate cell (cell providing the critical services that needs to avail immediately. In an embodiment, the UE 101 sends the interest indication to the gNB 102, to indicate that the UE 101 has prioritized reception of MBS in the RRC_CONNECTED state.

In an embodiment, the UE 101 can send the interest indication to the gNB 102 to indicate that the UE 101 is no longer receiving MBS and/or no longer interested in receiving MBS. For example, UE may have a complete loss of interest in MBS. In instance, the reception of the interest indication at the gNB 102 allows the gNB 102 (or RAN) to release resources that were dedicated to the UE 101 for providing MBS to the UE 101. The gNB 102 may allocate the released resources to other UEs (101) that have sent interest indications to the gNB 102 to indicate that the UEs (101) intend to avail MBS, or when a UE (101) interested in availing MBS camps on the cell in which the gNB 102 is deployed. Thus, receiving interest indications from the UE 101, and the other UEs (101), allows the gNB 102 to dynamically allocate resources.

In an embodiment, consider that the procedure of sending interest indication and availing MBS is based on the A2 approach. Consider that the UE 101 intends to avail a multicast service and the UE 101 is in the RRC_CONNECTED state. If the gNB 102 is not providing MBS, the UE 101 can send an interest indication to the gNB 102. However, if the UE 101 is in the RRC_IDLE state or the RRC_INACTIVE state, the UE 101 can switch to the RRC_CONNECTED state and send the interest indication. The UE 101 sending the interest indication can ensure handover of the UE 101, triggered by the gNB (102), to a target gNB (102) in a target cell supporting the multicast service. On the other hand, if the gNB 102 is providing MBS (for example the multicast service that the UE 101 intends to avail), the UE 101 can initiate a service joining procedure and send an interest indication to the gNB 102 to avail the intended multicast service.

In an embodiment, the UE 101 may refrain from sending interest indication to the gNB 102, if one or more MBS of interest to the UE 101 are being joined or is already joined, and the by the gNB 102 is aware about the one or more MBS of interest and the joining of the one or more MBS of interest. In another embodiment, the UE 101 sends the interest indication irrespective of multicast service joining status. In this instance, the sent interest indication can be used as a signaling message to be sent to the gNB 102 (RAN).

In an embodiment, the UE 101 can send the interest indication to the gNB 102 for notifying the gNB 102 that the UE 101 is currently not interested to receive MBS and that the UE 101 is not interested to avail MBS currently being received by the UE 101. The interest indication sent by the UE 101 may inform the gNB 102 about the priorities of the UE 101 for availing unicast services and MBS. The interest indication may also inform the preference of the UE 101 in availing MBS in PTM mode, PTP mode or split bearer mode, if the UE 101 intends to avail MBS. The interest indication sent by the UE 101 may further inform the gNB 102 about the preference of at least one of a Bandwidth Part (BWP), a bandwidth, frequencies, and sub-carrier spacing, to be used for availing unicast or MBS, and one or more broadcast services that the UE 101 is intending to avail. Further, interest indication can include information comprising the operating capabilities for the UE 101 (such as baseband resource or computational capabilities of the UE 101) currently utilized to receive MBS and/or currently available to receive unicast services (such as carrier aggregation configurations). The capability information may pertain to UE 101 receiving MBS through Receive Only Mode (ROM), Free-To-Air (FTA) services, LTE terrestrial broadcast services, Multi-Subscriber Identity Module (MUSIM) operations (engaging some of the resources, Reception paths (RX links or carriers) or computational capabilities, of the UE 101 semi-statistically or dynamically), and so on.

In an embodiment, the interest indication, sent by the UE 101, can be used for supporting transfer of MBS of interest to the UE 101 from the (source) gNB 102 to at least one of a plurality of target gNBs (102), if the UE 101 is mobile and if the mobility of the UE 101 necessitates a handover procedure. The source gNB 102 can forward the interest indication to the at least one of the plurality of target gNBs (102). The interest indication can include the MBS of interest pertaining to the UE 101 (MBS that are currently being received and/or MBS that are intended to be received by the UE 101) and MBS configuration of the MBS of interest. The interest indication allows the source gNB 102 to handover the UE 101 to an appropriate target gNB (102), from amongst a plurality of target gNBs, providing the MBS of interest, and to inform the at least one of a plurality of target gNBs (102) about the required MBS to be provided to the UE 101 after the handover of the UE 101. The at least one of the plurality of target gNBs (102) can set up at least one MBS session pertaining to the MBS of interest, which are presently not established. The target gNB (102) can provide the (source) gNB 102, MBS configurations for the MBS sessions have been previously established or newly established MBS sessions. Further, the target gNB (102) can provide, to the source gNB 102, MBS configuration parameters used in the at least one of a plurality of target cells associated with the target gNB 102. The source gNB 102 can provide the received MBS configuration parameters to the UE 101 during handover. In an example, the source gNB 102 can provide the received MBS configuration parameters to the UE 101 in a RRC Reconfiguration message after initiating the handover. Thus, the UE 101 is informed about MBS configuration parameters pertaining to the target gNB (for the reception of MBS service in the target cell), which allows avoiding or minimizing interruptions in MBS reception due to the handover. Thus, a better user experience can be achieved. For example, based on the MBS configuration in the RRC reconfiguration message, the UE 101 may continue the ongoing broadcast or multicast services in the target cell or gNB or establish the interested broadcast or multicast services in the target cell or gNB. The ongoing broadcast or multicast services, which are not supported in the target cell or gNB, can be stopped, and attempts can be made to avail these broadcast or multicast services in unicast mode.

In an embodiment, when multiple target cell MBS configurations and/or execution conditions and measurements configurations, are provided to the UE 101 in a RRC reconfiguration message (for example: during Condition Handover (CHO) execution), the UE 101 can select the target cell and/or associated MBS configurations based on the fulfillment of the execution conditions and/or measurements criteria and/or support for the MBS of interest.

In an embodiment, an Internode Message (INM) exchanged between gNBs can be enhanced to enable the source gNB 102 to forward the interest indication, received from the UE 101, to the at least one of a plurality of target gNBs (102) during handover preparation. The enhancement in the INM also allows the at least one of a plurality of target gNB (102) to accurately perform admission control and decide to allow admission to the UE 101 to the target cell. The enhancement involves including an Information Element (IE) in a handover preparation message acting as INM. In an embodiment, the INM is the Handover Preparation Information message, sent from the source gNB 102 to the target gNB (102).

If the target gNB (102) supports the MBS that is being availed currently by the UE 101, at least one of the plurality of the target gNBs (102) acknowledges the Handover Preparation Information message by sending a response INM message. In an embodiment, the response INM is the Handover Acknowledge message, sent by the at least one of the plurality of target gNBs (102) to the source gNB 102. Further, at least one of the plurality of the target gNB (102) may indicate the list of supported MBS in the acknowledgement INM. In an embodiment, an IE is added into the handover preparation INM from the source gNB 102, in order to inform the at least one of the plurality of target gNB (102) about the MBS of interest for the UE 101. In an embodiment herein, the target gNB (102) can respond with an acknowledgement in order to indicate, in a response INM, the support, provided by the target gNB (102), for the MBS of interest. In an embodiment, the acknowledgement includes a list MBS supported at the target cell associated with the at least one of the plurality of target gNB (102). In an embodiment, configuration parameters for at least one MBS includes at least one of target cell MBS bearer configuration, DRX scheduling information, first received Packet Data Convergence Protocol PDCP sequence number, first Radio Link Control (RLC) receive sequence number, security context, keys and parameters, G-RNTI/C-RNTI, delivery mode supported (PTM, PTP, PTM+PTP) and other channel, layer and module configurations relevant for MBS reception.

In an embodiment herein, the interest indication can include a Temporary Mobile Group Identity (TMGI) list, a priority for MBS reception with respect to unicast reception, a preferred cast type, a preferred BWP, a frequency list, a preferred numerology, a preferred frequency range, resource or computational capability of the UE 101, and so on. The TMGI list indicates the MBS of interest for the UE (one or more MBS that the UE 101 is interested to receive) and one or more MBS that are currently being received by the UE 101. The priority indicates preference of the UE 101 for availing MBS or unicast services, wherein the priority may be sent to the gNB 102 for each BWP and each MBS. The preferred cast type indicates preference of the UE 101 for receiving MBS in the PTM mode or the PTP mode or the split bearer mode. The preferred cast type (PTP Radio Link Control (RLC) or PTM RLC or split MBS bearer) indicates a RLC bearer mode (PTM, PTP or PTM+PTP) preferred by the UE 101 to receive the MBS. For example, in certain scenarios, when the UE 101 is receiving unicast service in a BWP, and the UE 101 is constrained to receive MBS in another BWP, the UE 101 indicates its preference to receive MBS in PTP RLC bearer mode. The preferred BWP may be different from the current active BWP. For example, in scenarios, wherein the UE 101 capability is limited or the UE 101 is receiving unicast service in a certain BWP, the UE 101 indicates the BWP preferred by the UE 101 to receive MBS. The UE 101 can prepare a frequency list for availing the MBS of interest based on at least one of a program guide or USD, supported band combination, and system information. The system information can convey the frequencies or SAIs for the MBS. The preferred numerology indicates sub-carrier spacing. The preferred frequency range is either Frequency Range 1 (FR-1) (below 6 GHz) or Frequency Range 2 (FR-2) (above 6 GHz).

In an embodiment, the triggers for sending the interest indication message and/or information contents in the interest indication message can differ for broadcast services and multicast services. For example, a sub-set A of the specified triggers can be configured or utilized for sending interest indication message for broadcast services, and a sub-set B of the specified triggers can be configured or utilized for sending interest indication message for multicast services. In another example, a sub-set X of the specified information contents can be configured or utilized for reporting in the interest indication message for broadcast services, and a sub-set Y of the specified information contents can be configured or utilized for reporting in the interest indication message for multicast services.

The UE 101 can have the capability of simultaneously receiving MBS in MRBs over frequencies which are specified in the frequency list. In NR MBS, the priority (MBS over Unicast) relates to BWP, to which frequencies (in the frequency list) correspond. This is because NR MBS service can be provided over a BWP (at least one of configured BWPs and a dedicated MBS BWP).

In an embodiment, the UE 101 can send the interest indication at different events comprising successful RRC connection establishment, the UE 101 entering a MBS service area (viz., a broadcast service area and/or a multicast service area), the UE 101 leaving a MBS service area, start of a MBS session, stop of a MBS session, a change of interest in MBS to be received or receiving for UE 101, a complete loss of interest in MBS for UE 101, change in priority for MBS reception or unicast reception, change in broadcasted system information, change to serving cell that is broadcasting system information for MBS service, service area identity (SAI) and frequency mapping information, initiation of reception of MBS, termination of reception of MBS, change of frequency of reception of MBS, change of BWP of MBS reception, change of bandwidth of MBS reception, change of frequency range for MBS reception and a change in a subcarrier spacing of MBS, BWP switching or UE capability change (e.g. change in supported RX links/paths or change in baseband computational capabilities or resources) which cause inhibition and/or removal of inhibition for MBS support, and change in received signal strength.

In an embodiment the UE 101, in the RRC_IDLE state or the RRC_INACTIVE state, receiving or interested to receive MBS, sends an interest indication to the gNB 102. In order to send the interest indication, the UE 101 can switch to the RRC_CONNECTED state by establishing a RRC connection during Random Access Channel (RACH) procedure. If the UE 101 can send the interest indication in the RRC_INACTIVE state (for example: during small data transmission), the UE 101 does not need to switch to the RRC_CONNECTED state for sending the interest indication to the gNB 102. In order to send the interest indication in the RRC_IDLE or RRC_INACTIVE state, the UE 101 can send the interest indication as part of MSG-3 of RACH.

On receiving an interest indication in MSG-3 during 4 step RACH procedure, from the UE 101 in the RRC_IDLE state or the RRC_INACTIVE state, the gNB 102 can identify that the UE 101 does not require switching to the RRC_CONNECTED state, and, thereafter, release the RRC connection. As the interest indication is sent over MSG-3, the gNB 102 can send an acknowledgement to the UE 101 as a part of MSG-4. In an embodiment, the UE 101 continues in the RRC_IDLE state or the RRC_INACTIVE state (the state at which the UE 101 had sent the interest indication) upon receiving the acknowledgment from the gNB 102.

In an embodiment, the UE 101 and the gNB 102 may support a 2-step random access procedure. In such cases, the UE 101 in the RRC_IDLE state or in the RRC_INACTIVE state can send an MBS interest indication as part of MSG-A (first message) of the 2-step random access procedure. The gNB 102 can send an acknowledgement (of receiving the MBS interest indication from the UE 101) over MSG-B (second message) of the 2-step random access procedure. In an embodiment, the UE 101 can send the MBS interest indication over MSG-A of a 2-step random access procedure. In an embodiment, the UE 101 continues in the RRC_IDLE state or the RRC_INACTIVE state (the state at which the UE 101 had sent the interest indication) upon the receiving acknowledgment from the network in MSG-B.

If the interest indication to be sent by the UE 101 cannot be accommodated in MSG-3 of 4-step random access procedure or MSG-A of 2-step random access procedure, the UE 101 can send the interest indication over MSG-5 or RRC setup complete message. In order to indicate that the RRC connection is established exclusively for sending interest indication, in an embodiment, an IE can be included in RRC setup complete message. The IE can be utilized to inform the gNB 102 if the UE 101 prefers to remain in the RRC_CONNECTED state in other sessions. The gNB 102 can release the connection based on the information included in the IE, if the gNB 102 determines, based on the information included in the IE, that the connection is established exclusively for sending the interest indication. In another embodiment, the UE 101 can indicate, to the gNB 102, that the RRC connection has been established exclusively for sending interest indication, by sending an establishment cause, which is associated with the transmission of interest indication by the UE 101.

In an embodiment, the UE 101 can send an MBS interest indication over MSG-5 or RRC setup complete message. Once the UE 101 sends MSG-5, the UE 101 switches to the RRC CONNECTED state. The gNB 102 can acknowledge reception of the MBS interest indication over MSG-5 or during random access procedure. In an embodiment, the UE 101 returns to the RRC_IDLE state or the RRC_INACTIVE state (the state at which the UE 101 had sent the interest indication) on receiving the acknowledgment from the gNB 102. In an embodiment, the gNB 102 provides a RRC release or a RRC release with suspend config, to enable the UE 101 to transition to the RRC_IDLE state or the RRC_I-NACTIVE state.

In an embodiment, the UE 101 sends at least one of an interest indication message for broadcast services (b) an interest indication for multicast services (c) a common interest indication message for broadcast services and multicast services. When the common interest indication is utilized, still the triggers and the information content in the interest indication for MBS broadcast service and MBS multicast service can differ. In embodiment, interest indication carries an identified field to indicate whether interest indication carries interest information for the broadcast services or multicast services or both of broadcast and multicast services. Depending on the triggers and interest indication information need to be reported, UE can selectively or collectively build the interest indication message pertaining at least one pertaining to broadcast services and multicast services and send the interest indication to the gNB.

The following is a specification that can be included as a part of MBS Interest Indication procedure of 3rd Generation Partnership Project (3GPP):

X.Y.Z.2 Initiation: (X, Y, and Z, can Represent Specific Sections of the MBS Interest Indication Procedure SystemInformationBlockTypeX—This is a system information block transmitted in an MBS or non-MBS cell providing mapping information between one or more of MBS services, frequencies and Service Area Identities (SAIs).

SystemInformationBlockTypeY—This is a system information block transmitted in an MBS cell, and carries the configuration information for the MCCH.

MBS service(s) can be at least one of broadcast service or multicast service or a combination of broadcast service and multicast service.

In an embodiment, the following procedure is applied to MBS broadcast services, or MBS multicast services or both MBS broadcast and MBS multicast services. If the procedure is applied to MBS multicast service at least one of SystemInformationBlockTypeX and SystemInformationBlockTypeY and pertaining broadcast status in the PCell may not be applicable for MBS interest indication for MBS multicast services.

Upon initiating the MBS Interest Indication procedure, the UE 101 shall:

---

1. If SystemInformationBlockTypeX is broadcast by the PCell; or
2. Ensure having a valid version of SystemInformationBlockTypeX for the PCell, if present;
2. If the UE 101 did not transmit an MBSInterestIndication message since entering RRC_CONNECTED state; or
2. If, since the last time the UE 101 transmitted an MBSInterestIndication message, the UE 101 is connected to a PCell not broadcasting SystemInformationBlockTypeX:
   3. If the set of MBS frequencies of interest, determined in accordance with X.Y.Z.3, is not empty:
      4. Initiate transmission of the MBSInterestIndication message in accordance with X.Y.Z.4;
   3. Else if the set of MBS frequencies of interest, determined in accordance with X.Y.Z.3, has now become empty:
      4. Initiate transmission of the MBSInterestIndication message in accordance with X.Y.Z.4;

-continued

2. Else:
   3. If the set of MBS frequencies of interest, determined in accordance with X.Y.Z.3, has changed since the previous transmission of the MBSInterestIndication message; or
   3. If at least one of the subcarrier spacing or bandwidth parameter of MBS frequency of interest, determined in accordance with X.Y.Z.3, has changed since the previous transmission of the MBSInterestIndication message; or
   3. If the prioritization of reception of all indicated MBS frequencies compared to reception of any of the established unicast bearers has changed since the previous transmission of the MBSInterestIndication message: or
   3. If the preference of BWP has changed since the previous transmission of the MBSInterestIndication message: or
   3. If the preference of Cast-type (PTM RLC or PTP RLC) has changed (for example: due to change in received signal strength) since the previous transmission of the MBSInterestIndication message: or
   3. If the preference of Frequency range has changed since the previous transmission of the MBSInterestIndication message: or
   3. If the resources or computational capability of the UE 101 has changed since the previous transmission of the MBSInterestIndication message:
      4. Initiate transmission of the MBSInterestIndication message in accordance with X.Y.Z.4;

It is to be noted that the UE 101 may send an MBSInterestIndication even when the UE 101 is able to receive MBS services intended by the UE 101.
The MBSInterestIndication is sent to avoid a scenario of the gNB 102 allocating a configuration inhibiting MBS reception.
   3. Else if SystemInformationBlockTypeY is broadcast by the PCell:
      4. If, since the last time the UE 101 transmitted an MBSInterestIndication message, the UE 101 connected to a PCell not broadcasting SystemInformationBlockTypeY; or
      4. If the set of MBS of interest determined in accordance with X.Y.Z.3a is different from MBS-Services included in the previous transmission of the MBSInterestIndication message;
         5. Initiate transmission of the MBSInterestIndication message in accordance with X.Y.Z.4.

---

X.Y.Z.3 Determine MBS Frequencies of Interest

The UE 101 shall:

---

1. Consider a frequency to be part of MBS frequencies of interest if the following conditions are met:
   2. at least one MBS session the UE 101 is receiving, or is interested to receive, through an MBS Radio Bearer (MRB) (PTM or PTP or split bearer) is ongoing or about to start; and
   2. For at least one of these MBS sessions either SystemInformationBlockTypeX acquired from the PCell includes for the concerned frequency one or more MBS Service Area Identifiers (SAIs) as indicated in the User Service Description (USD) for this session; and
   2. The UE 101 is capable of simultaneously receiving MRBs on the set of MBS frequencies of interest, regardless of whether a serving cell is configured on each of these frequencies or not; and
   2. The supportedBandCombination the UE 101 included in UE-NR-Capability contains at least one band combination including the set of MBS frequencies of interest;

---

X.Y.Z.3a Determine MBS Services of Interest

The UE 101 shall:

---

1. Consider an MBS to be part of the MBS of interest if the following conditions are met:
   2. The UE 101 is MBS capable; and
   2. The UE 101 is receiving or is interested to receive the MBS of interest via MRB; and -continued 2. One session of the MBS of interest is ongoing or about to start; and
    2. One or more MBS SAIs in the MBS of interest is included in SystemInformationBlockTypeY, acquired from the PCell, for a frequency belonging to the set of MBS frequencies of interest, determined according to X.Y.Z.3.

X.Y.Z.4 Actions Related to Transmission of MBSInterestIndication

The UE 101 shall set the contents of the MBSInterestIndication message as follows:

1. If the set of MBS frequencies of interest, determined in accordance with
X.Y.Z.3, is not empty:
    2. Include MBS-FreqList and set it to include the MBS frequencies of interest sorted by decreasing order of interest, using the Evolved universal terrestrial radio access Absolute Radio Frequency Channel Number (EARFCN) corresponding with freqBandIndicator included in SystemInformationBlockType1 (for serving frequency), if applicable, and the EARFCN(s) as included in SystemInformationBlockTypeX (for neighboring frequencies);
    2. Include MBS-Priority if the UE 101 prioritizes reception of all indicated MBS frequencies above reception of any of the unicast bearers;
    2. Include preferred BWP
    2. Include preferred Cast type
    2. Include preferred Frequency Range
    2. If SystemInformationBlockTypeY is broadcast by the PCell:
        3. Include MBS-Services and set it to indicate the set of MBS services of interest determined in accordance with X.Y.Z.3a;
1. If the set of MBS frequencies of interest, determined in accordance with
X.Y.Z.3, has now become empty:
    2. Do not include any field and prepare an empty MBSInterestIndication message to convey complete loss of interest in MBS service The UE 101 shall submit the MBSInterestIndication message to lower layers for transmission.

In an embodiment, specification for the MBS interest indication sent through UE assistance information message is described as follows:

3.     If the received otherConfig includes the mbsInterestIndicationConfig:
    2.     If mbsInterestIndicationConfig is set to setup:
        3. Consider itself to be configured to provide MBS interest indication in accordance with X.Y.Z;
    2.     Else:
        3. Consider itself not to be configured to provide MBS interest indication.

Section X.Y.Z:

The UE 101 capable of MBS broadcast and/or MBS multicast reception may initiate the procedure if it was configured to do so, upon determining one of the triggers for sending the interest indication to the gNB 102, as configured by gNB 102.
1.     If configured to provide MBS interest indication for broadcast and/or multicast:
    2.     If the UE 101 has met events or triggers for interest indication for broadcast and/or multicast:
        3. Initiate transmission of the UEAssistanceInformation message to provide MBS interest indication for broadcast and/or multicast services.

Figure 2:
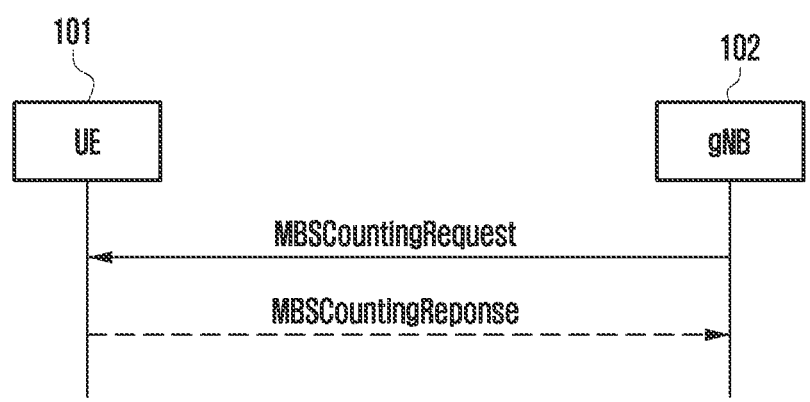
FIG. 2 is an example sequence diagram depicting a procedure for counting number of UEs in idle mode or inactive mode, which are availing MBS in NR, according to an embodiment of the disclosure.

FIG. 2 is an example sequence diagram depicting a procedure for counting number of UEs (101) in the RRC_IDLE state or the RRC_INACTIVE state availing MBS in NR, according to an embodiment of the disclosure.

In an embodiment, the counting procedure involves counting number of UEs (101) receiving MBS through an MRB or interested to receive MBS through an MRB. If the UEs (101) are availing multicast services and are in the RRC_CONNECTED state, the gNB 102 does not perform the counting procedure. However, if the UEs (101) are in the RRC_IDLE state or the RRC_INACTIVE state while availing multicast and/or broadcast services, the gNB 102 performs the counting procedure, as the gNB 102 is not aware of the exact number of UEs (101) receiving MBS in NR. If the UEs (101) are availing broadcast services and irrespective of whether the UEs (101) are in the RRC_CONNECTED state, the RRC_IDLE state, or the RRC_INACTIVE state, the gNB 102 performs the counting procedure.

Referring to FIG. 2, the counting procedure is initiated by the gNB 102 sending an MBS counting request to a UE (101) availing MBS. For the sake of illustration, a single UE (101) is considered. The gNB 102 may send a plurality of MBS counting requests. In order to respond to the counting request, the UE (101) needs to switch to the RRC_CONNECTED state. The UE (101) switching to the RRC_CONNECTED state can contribute significantly to Physical Random Access Channel (PRACH) overload. However, if the UE (101) is in the RRC_IDLE state or the RRC_INACTIVE state, the UE (101) may not be able to respond to the counting request. Thus, the gNB 102 may not be able to account for the UE (101) availing MBS in the RRC_IDLE state or the RRC_INACTIVE state. The embodiments include providing a probability factor to allow a predefined number of UEs (101) to switch to the RRC_CONNECTED state and respond to the counting request.

In order to avoid PRACH overload, a probability factor based approach is used by the gNB 102 for counting responses to counting requests from UEs (101) in the RRC_IDLE state or the RRC_INACTIVE state. The counting request, and, thereby, the response can also be dispersed over time for different UEs (101) to avoid sudden PRACH overload. For example, embedded signaling such as Medium Access Control (MAC) Control Element (CE) can be used for catering to different UEs (101) at different time instances or with service grouping over one or more MCCHs.

Proposed specification for NR MBS Counting procedure is described as follows:

X.Y.Z.3 Reception of the MBSCountingRequest Message by the UE 101

Upon receiving the MBSCountingRequest message, the UE 101 in the RRC_IDLE state or RRC_INACTIVE state shall:

1. If the UE 101 is receiving, via an MRB, or interested to receive, via an MRB, at least one MBS in the received countingRequestList: and
1. If the UE 101 fulfills the probability factor set for RRC_IDLE or RRC_INACTIVE states, as applicable and/or UE 101 fulfills the timing requirement to respond to the counting Request
    2. UE 101 transit to the RRC_CONNECTED state from RRC_IDLE or RRC_INACTIVE state, or UE 101 in RRC_INACTIVE state stays in RRC_INACTIVE state to respond to counting request: and
    2. for each MBS service included in the received countingRequestList:

3. If the UE 101 is receiving, via an MRB, or interested to receive, via an MRB, this MBS service:
   4. include an entry in the countingResponseList, within the MBSCountingResponse message, with countingResponseService set to the index of the entry in the countingRequestList, within the received MBSCountingRequest that corresponds with the MBS the UE 101 is receiving or interested to receive;
2. Submit the MBSCountingResponse message to lower layers for transmission upon which the procedure ends;

In an embodiment, the gNB 102 can send the counting request to the UE 101 through either of System Information Block (SIB), MCCH, Downlink Control Information (DCI), MAC CE or paging, and so on. In an embodiment, in order to avoid duplication of interest indication for RRC_CONNECTED state UEs (101) and counting for a representative RRC_IDLE or RRC_INACTIVE state UEs (101), two messages for counting response and interested indication can be unified. For example, the counting response can be conveyed using an interest indication message with only MBS (TMGI list) and same message type in the identification field.

FIG. 1 shows units of the system 100, but it is to be understood that other embodiments are not limited thereon. In other embodiments, the system 100 may include less or more number of units. Further, the labels or names of the units of the system 100 are used only for illustrative purpose and does not limit the scope of the disclosure. One or more units can be combined together to perform same or substantially similar function in the system 100.

Figure 3:
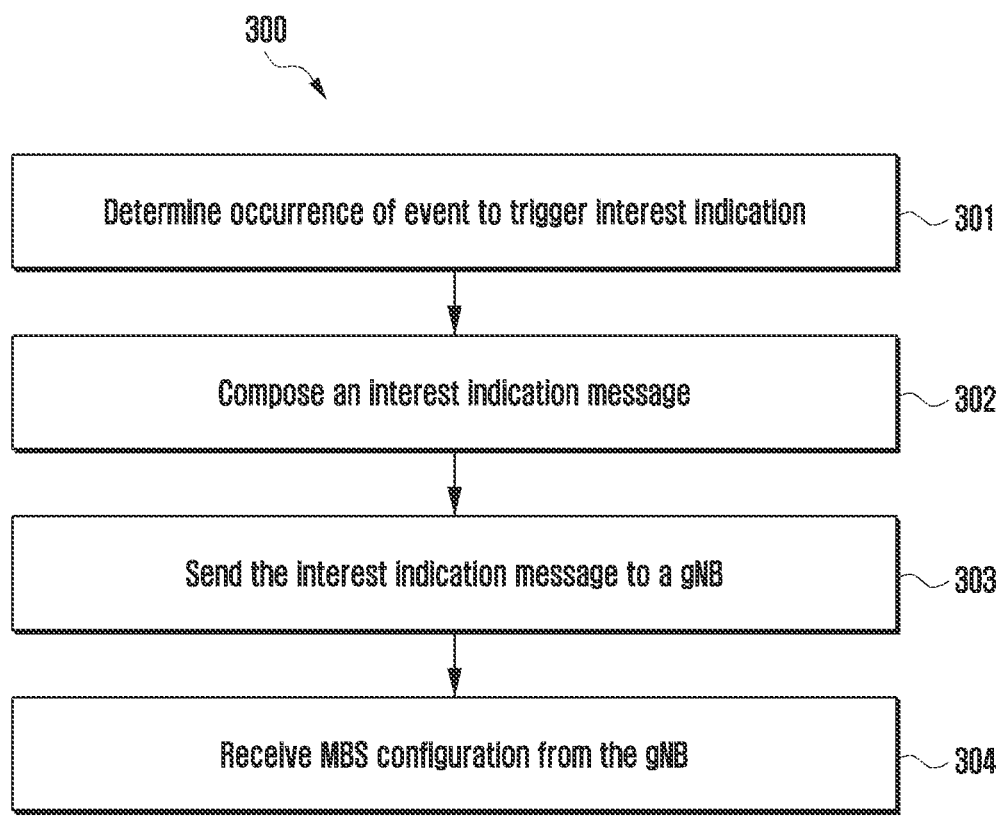
FIG. 3 is a flowchart depicting a method for availing, by the UE, MBS from a gNB, according to an embodiment of the disclosure.

FIG. 3 is a flowchart 300 depicting a method for availing, by the UE 101, MBS from a gNB 102, according to an embodiment of the disclosure.

Referring to FIG. 3, at operation 301, the method includes detecting at least one event or trigger that would require sending an interest indication message. The events include successful RRC connection establishment, the UE 101 entering a MBS service area, the UE 101 leaving the MBS service area, start of a MBS session, stop of a MBS session, a change of MBS of interest, the UE 101 is no longer interested in receiving MBS, the UE 101 is no longer receiving MBS, change in priority for MBS reception or unicast reception, initiation and termination of reception of MBS, change in broadcasted system information, change in serving cell broadcasting system information for MBS service, SAI and frequency mapping information, BWP switching, change in capability of the UE 101 causing at least one of inhibition for MBS support and removal of the inhibition for MBS support, and change in at least one of received signal strength, frequency of reception of MBS, BWP of MBS reception, bandwidth of MBS reception, frequency range of MBS reception and a subcarrier spacing of MBS. At operation 302, the method includes composing an interest indication message.

At operation 303, the method includes sending an interest indication message to the gNB 102. The interest indication message indicates at least one MBS that the UE 101 is receiving currently and at least one MBS that the UE 101 is interested to receive. The interest indication message can further indicate that the UE 101 is no longer receiving MBS; the UE 101 is no longer interested in receiving MBS; at least one frequency, from amongst a plurality of frequencies, for MBS reception; priority of MBS reception, and priority of unicast reception; preference for operating in MBS PTM mode, MBS PTP mode, a MBS split bearer mode and an unicast mode; preference for at least one of BWP, bandwidth, frequency range and sub-carrier spacing, for receiving one of the at least one MBS and unicast services; and resource capability of the UE 101 and computational capability of the UE 101.

The interest indication message comprises a TMGI list, wherein the TMGI list indicates at least one MBS the UE 101 is interested to receive and the at least one MBS currently received by the UE 101; a priority, wherein the priority indicates preference for MBS reception or unicast reception, wherein the priority is sent to the gNB 102 for at least one of each BWP and each MBS; a preferred cast type, wherein the preferred cast type indicates preference for receiving MBS in the PTM mode or the PTP mode; a frequency list, wherein the frequency list indicates preferred frequencies for receiving MBS; a preferred BWP, wherein MBS is provided in the preferred BWP; a preferred bandwidth; a preferred sub-carrier spacing; a preferred frequency range; and an indication for resource or computational capability of the UE 101.

At operation 304, the method includes receiving, by MBS configuration, from the gNB 102, as response to the interest indication. The MBS configuration corresponds to the at least one MBS that the UE 101 is receiving or is interested to receive. The MBS configuration includes the MBS bearer configuration pertaining to at least one of PTM bearer, PTP bearer and split MBS bearer; DRX configurations; security configuration; Service Data Adaptation Protocol (SDAP), PDCP, RLC and MAC configurations; Hybrid Automatic Repeat Request (HARQ) configuration parameters; BWP configuration; first PDCP receive sequence number; first RLC receive sequence number; a BWP switching configuration; and a handover command to transition the UE 101 to a cell or gNB to enable continuation or reception of the at least one MBS the UE 101 is currently receiving or the at least one MBS the UE 101 is interested to receive.

The various actions in the flowchart 300 may be performed in the order presented, in a different order, or simultaneously. Further, in some embodiments, some actions listed in FIG. 3 may be omitted.

Figure 4:
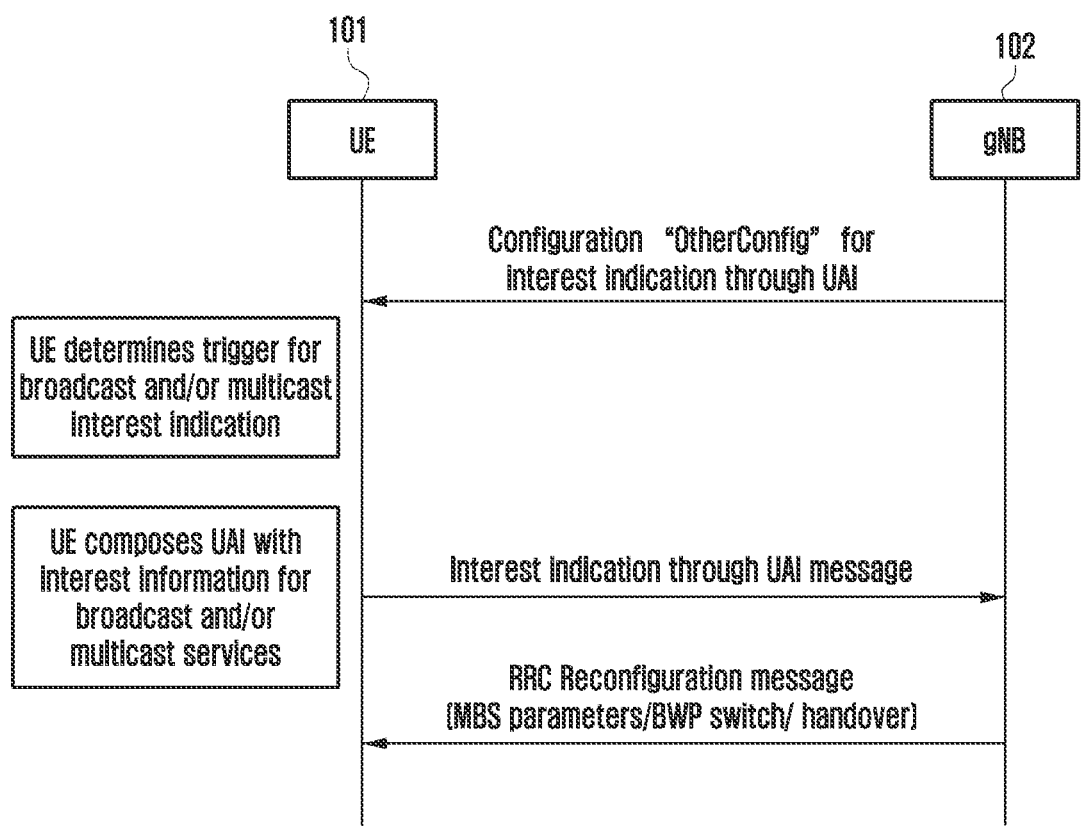
FIG. 4 is an example sequence diagram depicting a procedure for sending the interest indication using UE Assistance information, according to an embodiment of the disclosure.

FIG. 4 is an example sequence diagram depicting a procedure for sending the interest indication using UE Assistance information, according to an embodiment of the disclosure.

Referring to FIG. 4, the UE 101 can receive a configuration "OtherConfig" from the gNB 102. The configuration may indicate availability of support for MBS, i.e., the gNB 102 supporting the at least one MBS of interest for the UE 101. The configuration may also indicate, to the UE 101, that the UE 101 can send an interest indication message in the UAI message. Once the UE 101 receives the configuration "OtherConfig from the gNB 102, the UE 101 determines whether the UE 101 needs to send an interest indication to the gNB 102. In an embodiment, the UE 101 may send the interest indication if the UE 101 is interested to receive one or more MBS, the UE 101 is no longer interested to receive the one or more MBS, indicate that the UE 101 is receiving the one or more MBS.

In an embodiment, when the UE 101 determines that there is a requirement to send an interest indication to the gNB 102, the UE 101 may compose an UAI message. For example, consider that the UE 101 intends to receive one or more multicast services and one or more broadcast services. In this scenario, the UE 101 can compose the UAI message comprising an interest indication message, wherein the interest indication message includes the one or more multicast services and the one or more broadcast services. In another example, consider that the UE 101 intends to inform the gNB 102 that the UE 101 is currently receiving the one or more multicast services and the UE 101 is no longer interested to receive the one or more broadcast services. In this scenario, the UE 101, in a composed UAI message, comprising an interest indication message, can include the one or more multicast services and zero broadcast services (for example, an empty message container with zero broadcast services indicates loss of interest). In an embodiment, the UE 101, which was previously receiving one or more multicast (or broadcast) services, can lose interest in receiving all multicast (or broadcast) services.

In an embodiment, once the UE 101 has composed the UAI message, comprising the interest indication message, the UE 101 can send the UAI message to the gNB 102. In an embodiment, the gNB 102 sends an RRC reconfiguration message as a response to the UAI message. The RRC reconfiguration message can include MBS configuration for enabling the UE 101 to receive the one or more multicast services and the one or more broadcast services, MBS parameters, BWP switch, handover configuration, and so on.

Figure 5:
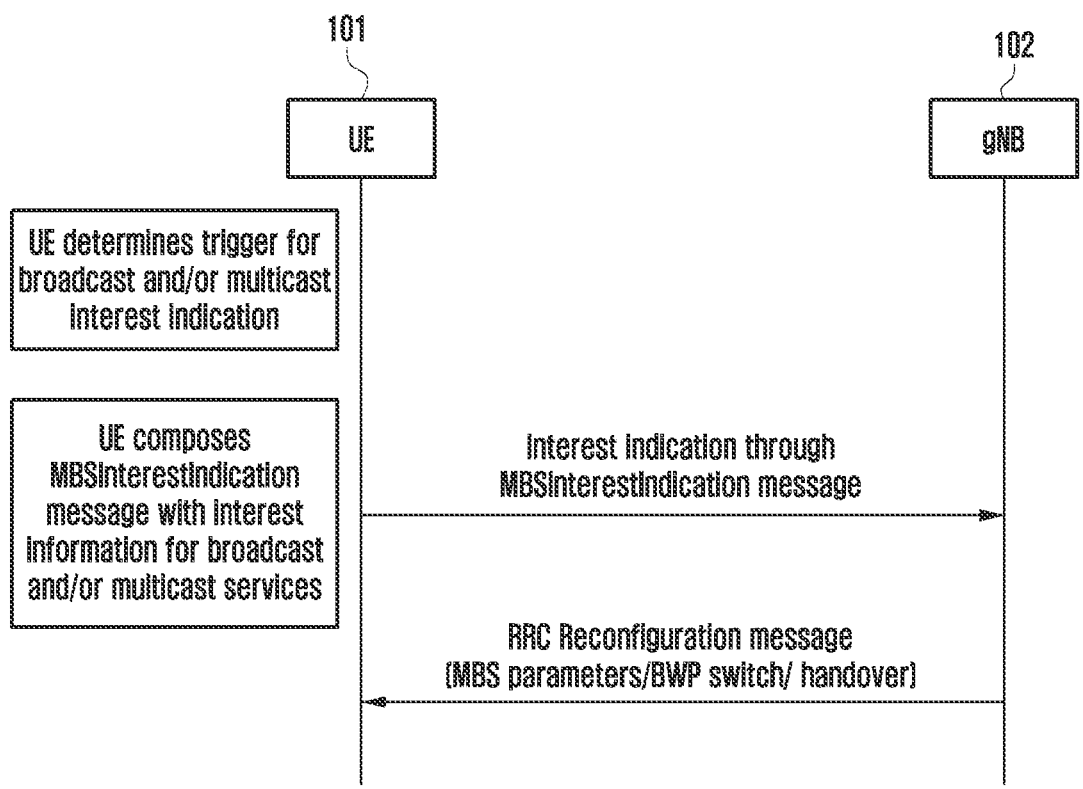
FIG. 5 is an example sequence diagram depicting a procedure for sending the interest indication using MBS interest indication message, according to an embodiment of the disclosure.

FIG. 5 is an example sequence diagram depicting a procedure for sending the interest indication using MBS interest indication message, according to an embodiment of the disclosure.

Referring to FIG. 5, the UE 101 can determine whether the UE 101 needs to send an interest indication to the gNB 102. In an embodiment, when the UE 101 determines that there is a requirement to send an interest indication to the gNB 102, the UE 101 may compose an MBS interest indication message. For example, if the UE 101 intends to receive one or more multicast services and/or one or more broadcast services, the UE 101 can compose the MBS interest indication message comprising an interest indication message. The interest indication message includes the one or more multicast services and the one or more broadcast services. In an embodiment, once the UE 101 has composed the MBS interest indication message, comprising the interest indication message, the UE 101 can send the MBS interest indication message to the gNB 102. In an embodiment, the gNB 102 sends an RRC reconfiguration message as a response to the MBS interest indication message. The RRC reconfiguration message can include MBS configuration for enabling the UE 101 to receive the one or more multicast services and the one or more broadcast services, MBS parameters, BWP switch, handover configuration, and so on.

Figure 6:
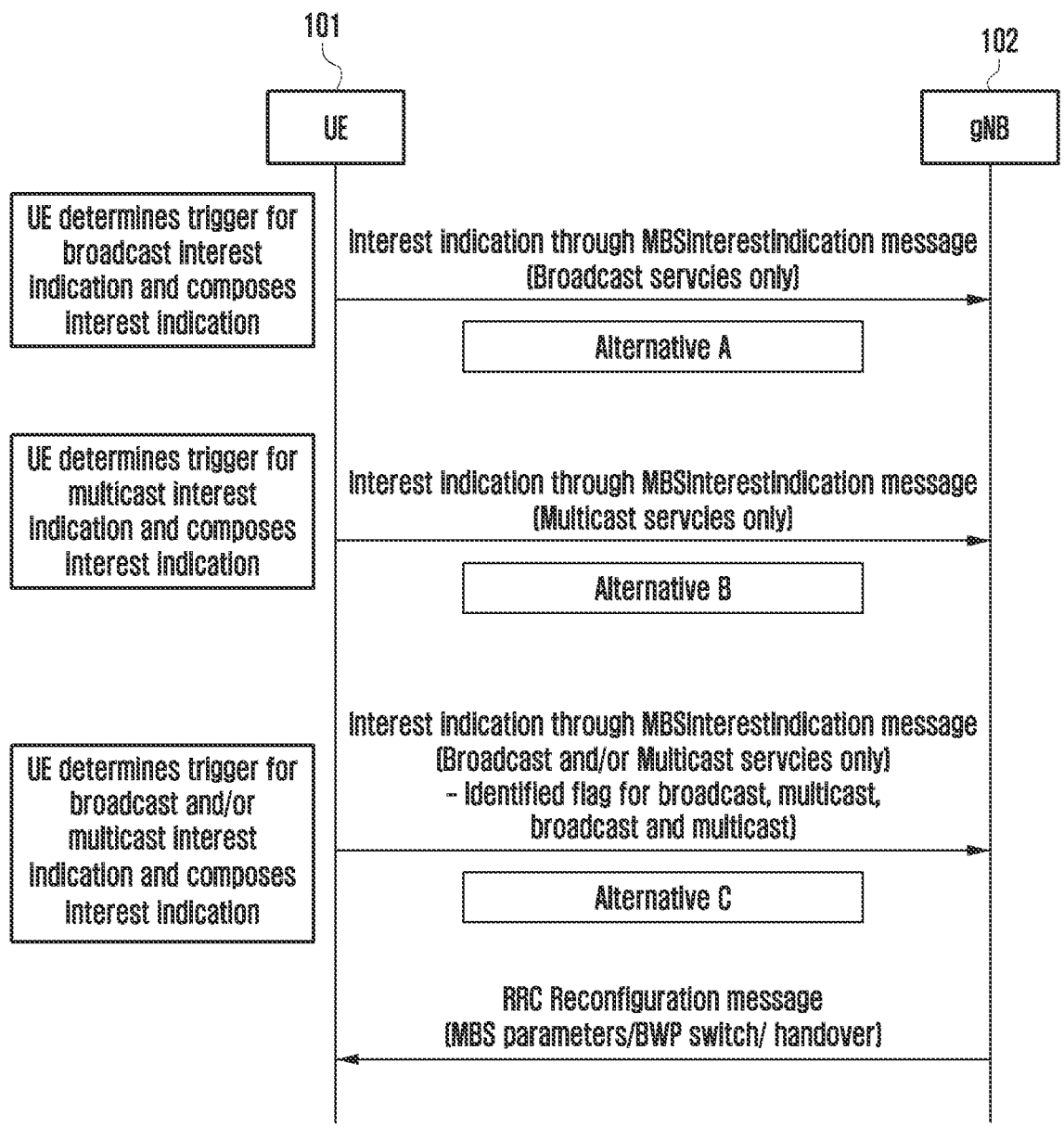
FIG. 6 is an example sequence diagram depicting a procedure for sending interest indication using MBS interest indication message for receiving either broadcast services, multicast services, or broadcast services and multicast services, according to an embodiment of the disclosure.

FIG. 6 is an example sequence diagram depicting a procedure for sending interest indication using MBS interest indication message for receiving either broadcast services, multicast services, or broadcast services and multicast services, according to an embodiment of the disclosure.

Referring to FIG. 6, in alternative A, consider that the UE 101 has determined that the UE 101 needs to send an interest indication to the gNB 102 for receiving broadcast services. The UE 101 may send the interest indication in an MBS interest indication message. In this scenario, the interest indication message includes one or more broadcast services. In an embodiment, the gNB 102 sends an RRC reconfiguration message as a response to the MBS interest indication message. The RRC reconfiguration message can include MBS configuration for enabling the UE 101 to receive the one or more broadcast services, MBS parameters, BWP switch, handover configuration, and so on.

In alternative B, consider that the UE 101 has determined that the UE 101 needs to send an interest indication to the gNB 102 for receiving multicast services. The UE 101 may send the interest indication in an MBS interest indication message (RRC signaling message). In this scenario, the interest indication message includes one or more multicast services. In an embodiment, the gNB 102 sends an RRC reconfiguration message as a response to the MBS interest indication message. The RRC reconfiguration message can include MBS configuration for enabling the UE 101 to receive the one or more multicast services, MBS parameters, BWP switch, handover configuration, and so on.

In an embodiment, the UE 101 employs the alternative A to send MBS interest indication for broadcast services and the alternative B to send MBS interest indication for multicast services. Thus, the UE 101 can send different (two) messages for sending MBS interest indications for the broadcast services and the multicast services.

In alternative C, consider that the UE 101 has determined that the UE 101 needs to send an interest indication to the gNB 102 for receiving broadcast services and/or multicast services. The UE 101 may send the interest indication in an MBS interest indication message. In this scenario, the interest indication message includes one or more broadcast services and/or one or more multicast services. In an embodiment, the gNB 102 sends an RRC reconfiguration message as a response to the MBS interest indication message. The RRC reconfiguration message can include MBS configuration for enabling the UE 101 to receive the one or more broadcast services and the one or more multicast services, MBS parameters, BWP switch, handover configuration, and so on.

Figure 7:
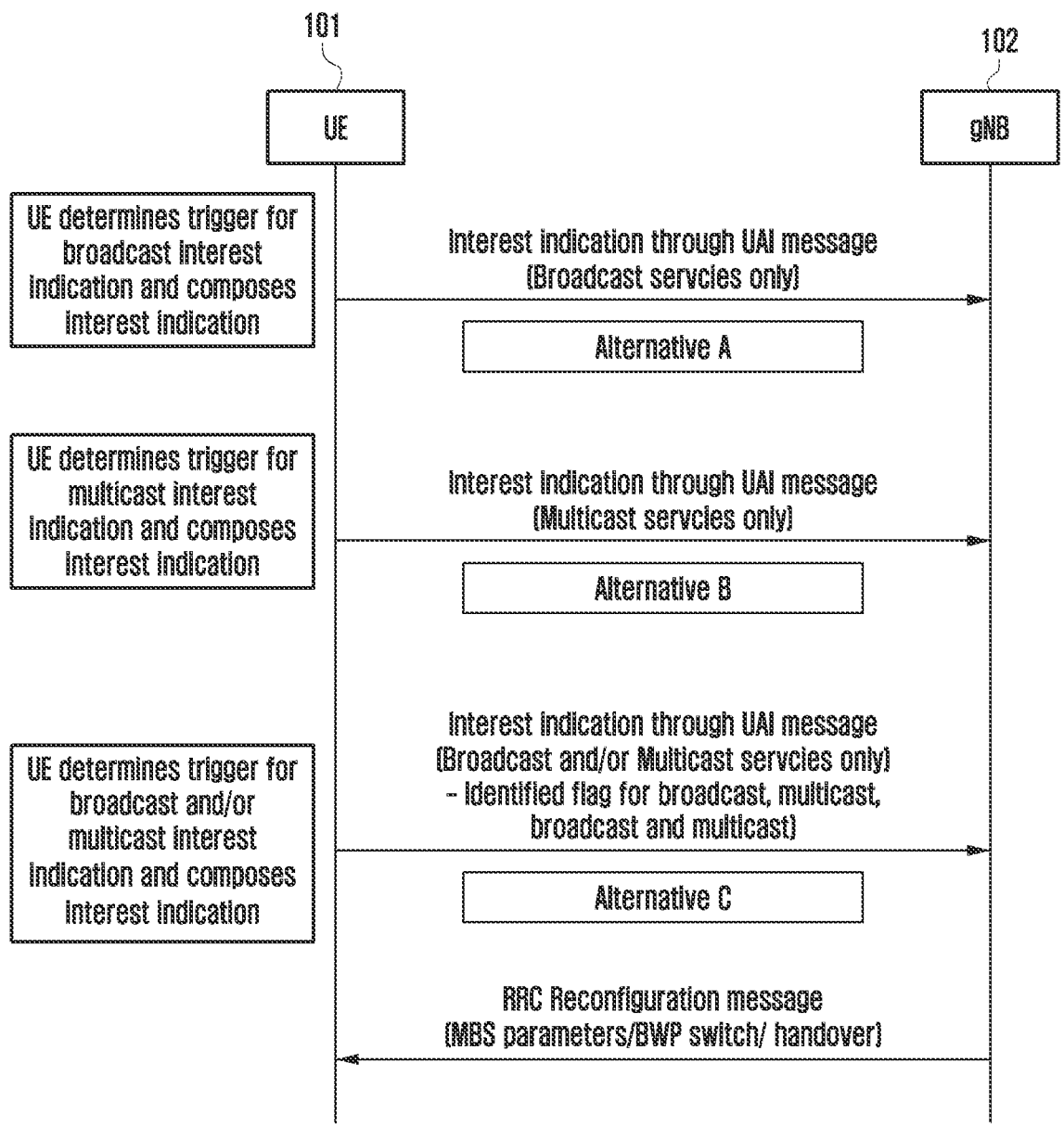
FIG. 7 is an example sequence diagram depicting a procedure for sending interest indication using UAI message for receiving either broadcast services, multicast services, or broadcast services and multicast services, according to an embodiment of the disclosure.

FIG. 7 is an example sequence diagram depicting a procedure for sending interest indication using UAI message for receiving either broadcast services, multicast services, or broadcast services and multicast services, according to an embodiment of the disclosure.

Referring to FIG. 7, in alternative A, consider that the UE 101 has determined that the UE 101 needs to send an interest indication to the gNB 102 for receiving broadcast services. The UE 101 may send the interest indication in an UAI message. In this scenario, the interest indication message includes one or more broadcast services. In an embodiment, the gNB 102 sends an RRC reconfiguration message as a response to the interest indication in UAI message. The RRC reconfiguration message can include MBS configuration for enabling the UE 101 to receive the one or more broadcast services, MBS parameters, BWP switch, handover configuration, and so on.

In alternative B, consider that the UE 101 has determined that the UE 101 needs to send an interest indication to the gNB 102 for receiving multicast services. The UE 101 may send the interest indication in an UAI message. In this scenario, the interest indication message includes one or more multicast services. In an embodiment, the gNB 102 sends an RRC reconfiguration message as a response to the interest indication in the UAI message. The RRC reconfiguration message can include MBS configuration for enabling the UE 101 to receive the one or more multicast services, MBS parameters, BWP switch, handover configuration, and so on.

In an embodiment, the UE 101 employs the alternative A to send interest indication in a UAI message for the broadcast services and the alternative B to send interest indication in a UAI message for multicast services. Thus, the UE 101 can send different (two) UAI messages for sending interest indications for the broadcast services and the multicast services.

In alternative C, consider that the UE 101 has determined that the UE 101 needs to send an interest indication to the gNB 102 for receiving broadcast services and/or multicast services. The UE 101 may send the interest indication in an UAI message. In this scenario, the interest indication message includes one or more broadcast services and/or one or more multicast services. In an embodiment, the gNB 102 sends an RRC reconfiguration message as a response to the UAI message. The RRC reconfiguration message can include MBS configuration for enabling the UE 101 to receive the one or more broadcast services and the one or more multicast services, MBS parameters, BWP switch, handover configuration, and so on.

Figure 8:
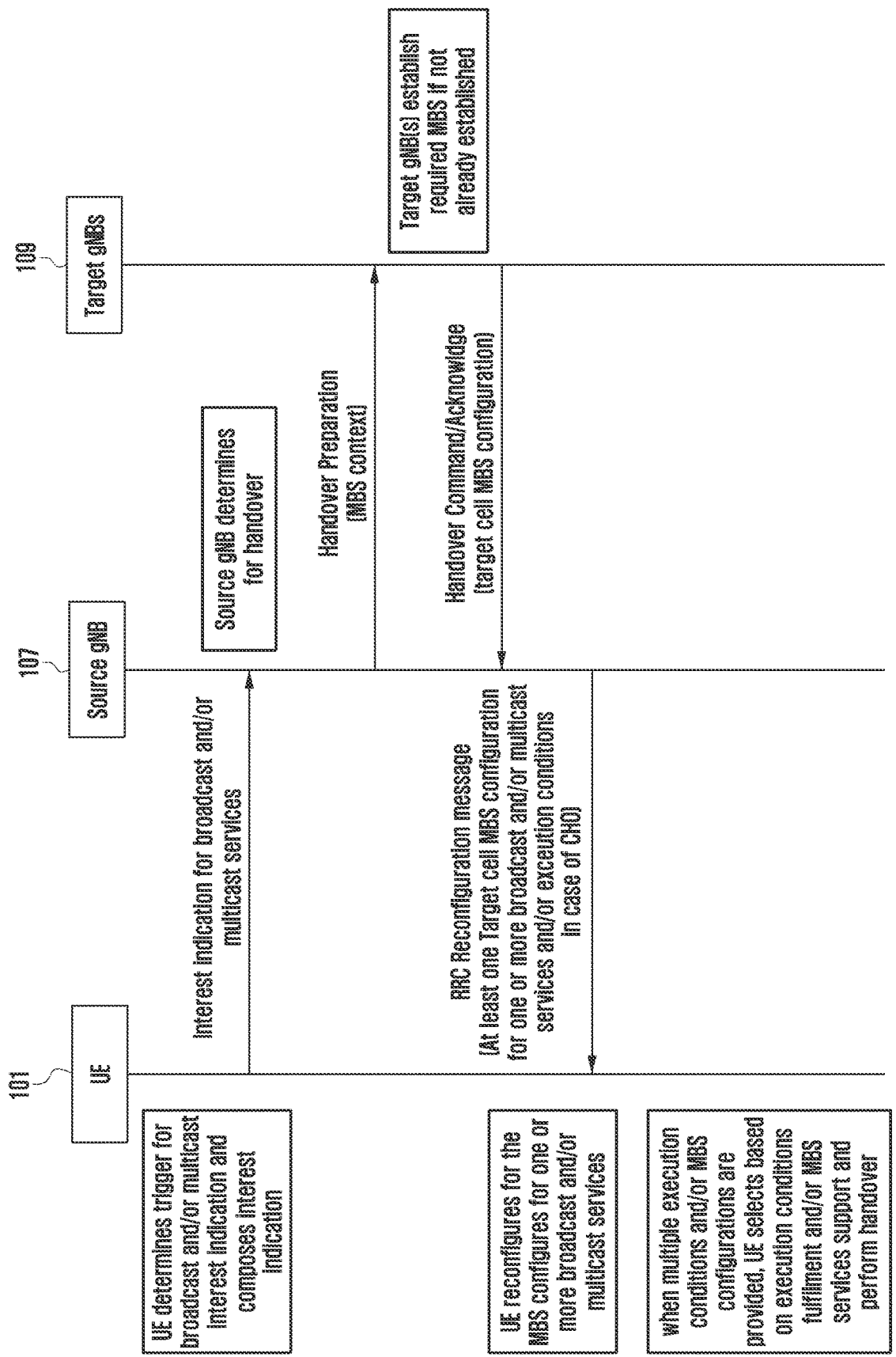
FIG. 8 is an example sequence diagram depicting a procedure involved during handover in context of sending interest indication and handling reception of MBS, according to an embodiment of the disclosure.

FIG. 8 is an example sequence diagram depicting a procedure involved during handover in context of sending interest indication and handling reception of MBS, according to an embodiment of the disclosure.

Referring to FIG. 8, the UE 101 can determine that the UE 101 needs to send an interest indication to a gNB such as source gNB 107 and/or target gNB (109). The UE 101 may compose an interest indication message to receive one or more multicast services and/or one or more broadcast services. The interest indication message includes the one or more multicast services and/or the one or more broadcast services. The interest indication can include the MBS of interest pertaining to the UE 101 (MBS that are currently being received and/or MBS that are intended to be received by the UE 101). The interest indication allows the source gNB 107 to handover the UE 101 to an appropriate target gNB (109), from amongst a plurality of target gNBs, providing the MBS of interest, and to inform the at least one of a plurality of target gNBs (109) about the required MBS to be provided to the UE 101 after the handover of the UE 101. On receiving the interest indication message, the (source) gNB 107 may initiate handover procedure (if the (source) gNB 107 is not providing the one or more multicast services and/or the one or more broadcast services).

The source gNB 107 can forward the interest indication to the at least one of the plurality of target gNBs. The at least one of the plurality of target gNBs (109) can set up at least one MBS session pertaining to the MBS of interest, which are presently not established. The plurality of target gNBs (109) can provide the (source) gNB 107, MBS configurations for the MBS sessions have been previously established or newly established MBS sessions. Further, the target gNB (109) can provide, to the source gNB 107, MBS configuration parameters used in the at least one of a plurality of target cells associated with the target gNB 109. The source gNB 107 can provide the received MBS configuration parameters to the UE 101 in a RRC reconfiguration message during handover.

When the source gNB 107 provides multiple target cell MBS configurations and/or execution conditions and measurements configurations, to the UE 101, in a RRC reconfiguration message, the UE 101 can select the target cell and/or associated MBS configurations based on the fulfillment of the execution conditions and/or measurements criteria and/or support for the MBS of interest. For example, the UE 101 may consider the multicast and/or broadcast services on basis of their priority order while selecting the target cell from amongst a plurality of target cells.

Figure 9:
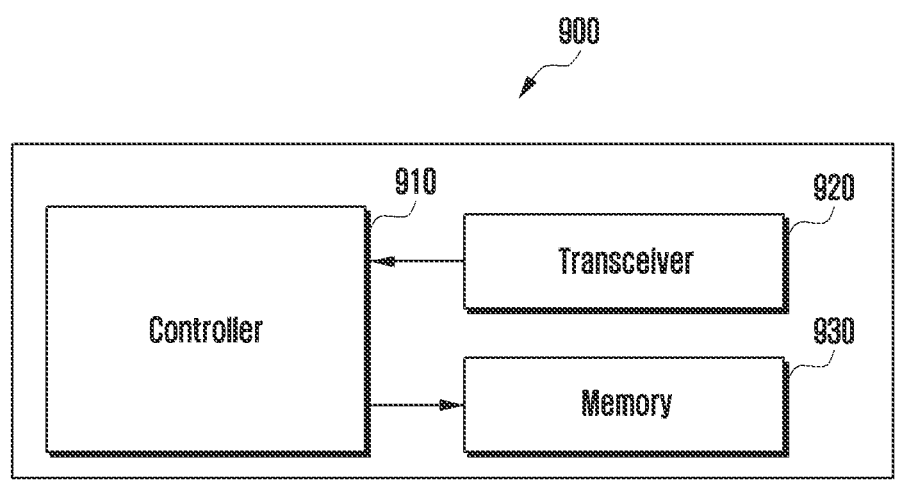
FIG. 9 is a structure of a UE, according to an embodiment of the disclosure.

FIG. 9 is a structure of a UE, according to an embodiment of the disclosure.

Referring to the FIG. 9, the UE 900 may include a controller 910, a transceiver 920 and a memory 930. However, all of the illustrated components are not essential. The UE 900 may be implemented by more or less components than those illustrated in FIG. 9. In addition, the controller 910 and the transceiver 920 and the memory 930 may be implemented as a single chip according to another embodiment.

The UE 900 may correspond to UE described above.

The aforementioned components will now be described in detail.

The controller 910 may include one or more processors or other processing devices that control the provided function, process, and/or method. An operation of the UE 900 may be implemented by the controller 910. The controller 910 may control a signal flow between each block to perform the provided function, process, and/or method according to the embodiments of the disclosure.

The transceiver 920 may include an RF transmitter for up-converting and amplifying a transmitted signal, and an RF receiver for down-converting a frequency of a received signal. However, according to another embodiment, the transceiver 920 may be implemented by more or less components than those illustrated in components.

The transceiver 920 may be connected to the controller 910 and transmit and/or receive a signal. The signal may include control information and data. In addition, the transceiver 920 may receive the signal through a wireless channel and output the signal to the controller 910. The transceiver 920 may transmit a signal output from the controller 910 through the wireless channel.

The memory 930 may store the control information or the data included in a signal obtained by the UE 900. The memory 930 may be connected to the controller 910 and store at least one instruction or a protocol or a parameter for the provided function, process, and/or method. The memory 930 may include read-only memory (ROM) and/or random access memory (RAM) and/or hard disk and/or compact disc read only memory (CD-ROM) and/or digital versatile disc (DVD) and/or other storage devices.

Figure 10:
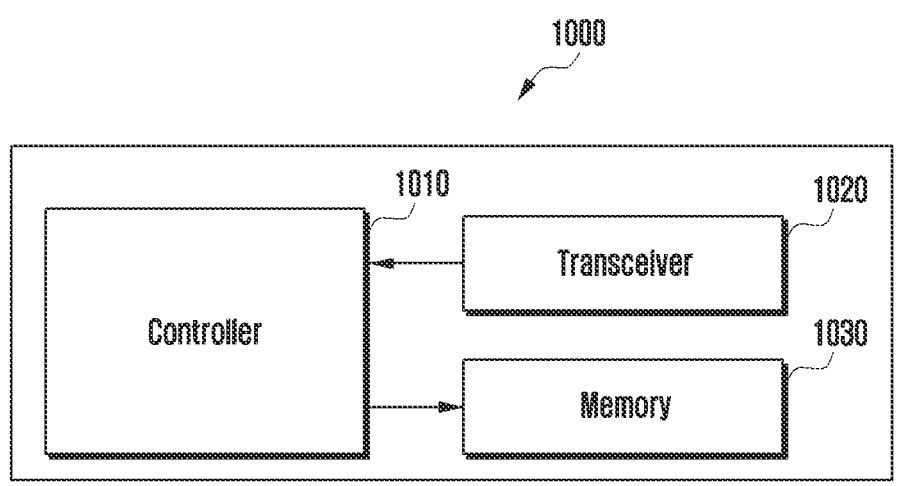
FIG. 10 is a structure of a base station, according to an embodiment of the disclosure.

FIG. 10 is a structure of a base station, according to an embodiment of the disclosure.

Referring to the FIG. 10, the base station 1000 may include a controller 1010, a transceiver 1020 and a memory 1030. However, all of the illustrated components are not essential. The base station 1000 may be implemented by more or less components than those illustrated in FIG. 10. In addition, the controller 1010 and the transceiver 1020 and the memory 1030 may be implemented as a single chip according to another embodiment.

The base station 1000 may correspond to a gNB described above.

The aforementioned components will now be described in detail.

The controller 1010 may include one or more processors or other processing devices that control the provided function, process, and/or method. An operation of the base station 1000 may be implemented by the controller 1010. The controller 1010 may control a signal flow between each block to perform the provided function, process, and/or method according to the embodiments of the disclosure.

The transceiver 1020 may include an RF transmitter for up-converting and amplifying a transmitted signal, and an RF receiver for down-converting a frequency of a received signal. However, according to another embodiment, the transceiver 1020 may be implemented by more or less components than those illustrated in components.

The transceiver 1020 may be connected to the controller 1010 and transmit and/or receive a signal. The signal may include control information and data. In addition, the transceiver 1020 may receive the signal through a wireless channel and output the signal to the controller 1010. The transceiver 1020 may transmit a signal output from the controller 1010 through the wireless channel.

The memory 1030 may store the control information or the data included in a signal obtained by the base station 1000. The memory 1030 may be connected to the controller 1010 and store at least one instruction or a protocol or a parameter for the provided function, process, and/or method. The memory 1030 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for sending interest indication to indicate whether the UE is interested in receiving multicast and/or broadcast services in NR, and multicast and/or broadcast services currently being received, if any, by the UE. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-Specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that the various changes in form and details may be made therein without departing from the spirit and scope of the disclosure as defined by the appended claims and their equivalents.

What is claimed is:

1. A method performed by a terminal in a wireless communication system, the method comprising:
   transmitting, to a base station, an interest indication message including a list of multicast and broadcast services (MBS) frequencies and a list of MBS services that the terminal is interested in receiving; and
   receiving, from the base station, a radio resource control (RRC) message for configuring an MBS configuration for the terminal,
   wherein the list of MBS services is set based on interested priority orders for the MBS services.

2. The method of claim 1, wherein the interest indication message further includes priority information between a reception of the list of MBS frequencies and a reception of unicast bearers and multicast bearers.

3. The method of claim 1, further comprising:
   in case that the terminal is no longer receiving or the terminal is no longer interested in receiving the MBS services, transmitting a second interest indication message.

4. The method of claim 1, wherein the MBS configuration includes at least one of a discontinuous reception (DRX) configuration, a packet data convergence protocol (PDCP) configuration, or a radio link control (RLC) configuration.

5. A terminal in a wireless communication system, the terminal comprising:
   a transceiver configured to transmit and receive a signal; and
   a processor coupled to the transceiver, wherein the processor is configured to:
      transmit, to a base station, an interest indication message including a list of multicast and broadcast services (MBS) frequencies and a list of MBS services that the terminal is interested in receiving, and
      receive, from the base station, a radio resource control (RRC) message for configuring an MBS configuration for the terminal,
   wherein the list of MBS services is set based on interested priority orders for the MBS services.

6. The terminal of claim 5, wherein the interest indication message further includes priority information between a reception of the list of MBS frequencies and a reception of unicast bearers and multicast bearers.

7. The terminal of claim 5, wherein the processor is further configured to transmit a second interest indication message, in case that the terminal is no longer receiving or the terminal is no longer interested in receiving the MBS services.

8. The terminal of claim 5, wherein the MBS configuration includes at least one of a discontinuous reception (DRX) configuration, a packet data convergence protocol (PDCP) configuration, or a radio link control (RLC) configuration.

9. A method performed by a base station in a wireless communication system, the method comprising:
   receiving, from a terminal, an interest indication message including a list of multicast and broadcast services (MBS) frequencies and a list of MBS services that the terminal is interested in receiving; and
   transmitting, to the terminal, a radio resource control (RRC) message for configuring an MBS configuration for the terminal,
   wherein the list of MBS services is set based on interested priority orders for the MBS services.

10. The method of claim 9, wherein the interest indication message further includes priority information between a reception of the list of MBS frequencies by the terminal and a reception of unicast bearers and multicast bearers by the terminal.

11. The method of claim 9, further comprising:
in case that the terminal is no longer receiving or the terminal is no longer interested in receiving the MBS services, receiving a second interest indication message.

12. The method of claim 9, wherein the MBS configuration includes at least one of a discontinuous reception (DRX) configuration, a packet data convergence protocol (PDCP) configuration, or a radio link control (RLC) configuration.

13. A source base station in a wireless communication system, the base station comprising:
a transceiver configured to transmit and receive a signal; and
a processor coupled to the transceiver, wherein the processor is configured to:
receive, from a terminal, an interest indication message including a list of multicast and broadcast services (MBS) frequencies and a list of MBS services that the terminal is interested in receiving, and
transmit, to the terminal, a radio resource control (RRC) message for configuring an MBS configuration for the terminal,
wherein the list of MBS services is set based on interested priority orders for the MBS services.

14. The base station of claim 13, wherein the interest indication message further includes priority information between a reception of the list of MBS frequencies by the terminal and a reception of unicast bearers and multicast bearers by the terminal.

15. The base station of claim 13, wherein the processor is further configured to:
receive a second interest indication message, in case that the terminal is no longer receiving or the terminal is no longer interested in receiving the MBS services.

16. The base station of claim 13, wherein the MBS configuration includes at least one of a discontinuous reception (DRX) configuration, a packet data convergence protocol (PDCP) configuration, or a radio link control (RLC) configuration.

* * * * *